US006501920B2

(12) United States Patent
Goto et al.

(10) Patent No.: US 6,501,920 B2
(45) Date of Patent: Dec. 31, 2002

(54) COPYING MACHINE, IMAGE PROCESSING APPARATUS, AND IMAGE PROCESSING METHOD FOR ORIENTING IMAGES

(76) Inventors: Jiro Goto, c/o Minolta Co., Ltd., Osaka Kokusai Building, 3-13, 2-chome, Azuchi-machi, Chuo-ku, Osaka-shi, Osaka 541-8556 (JP); Kazuhiro Ueda, c/o Minolta Co., Ltd., Osaka Kokusai Building, 3-13, 2-chome, Azuchi-machi, Chuo-ku, Osaka-shi, Osaka 541-8556 (JP); Eiko Hirano, c/o Minolta Co., Ltd., Osaka Kokusai Building, 3-13, 2-chome, Azuchi-machi, Chuo-ku, Osaka-shi, Osaka 541-8556 (JP)

( * ) Notice: Subject to any disclaimer, the term of this patent is extended or adjusted under 35 U.S.C. 154(b) by 0 days.

(21) Appl. No.: 09/778,884

(22) Filed: Feb. 8, 2001

(65) Prior Publication Data

US 2001/0014228 A1 Aug. 16, 2001

(30) Foreign Application Priority Data

Feb. 10, 2000 (JP) ....................................... 2000-033367

(51) Int. Cl.[7] ............................................... G03G 15/00
(52) U.S. Cl. ........................................................ 399/81
(58) Field of Search ........................... 399/81, 9, 8, 18, 399/19

(56) References Cited

U.S. PATENT DOCUMENTS 5,471,549 A * 11/1995 Kurosu et al. .............. 382/290
5,508,810 A * 4/1996 Sato ........................... 358/296
5,875,035 A * 2/1999 Motosugi et al. ........... 358/296
5,889,884 A 3/1999 Hashimoto et al.

FOREIGN PATENT DOCUMENTS

| | | | |
|---|---|---|---|
| JP | 06-225090 | | 8/1994 |
| JP | 6-225090 | * | 8/1994 |
| JP | 08-202887 | | 8/1996 |
| JP | 08-336038 | | 12/1996 |
| JP | 9-127742 | * | 5/1997 |
| JP | 09-282468 | | 10/1997 |
| JP | 10-150552 | * | 6/1998 |

* cited by examiner

*Primary Examiner*—Quana M. Grainger

(57) ABSTRACT

An image processing apparatus includes an imput section for inputting image data, a discriminating section for discriminating a process to which the image data should be subjected, and a display for displaying an image represented by the image data when the discriminating section fails in the discrimination. The apparatus further includes an interface for receiving information inputted by an operator and being relevant to the process to which the image should be subjected, and an image processing section for processing the image data according to a result of discrimination of the discriminating section and the information inputted via the interface. Through the above apparatus, by supplementing the discrimination as to whether or not to process the image data by human determination, processing of the image data is reliably executed.

14 Claims, 16 Drawing Sheets

OP
91
92
93
94
95
97
98
96
100
99
BASIC
FINISH
COPY FORM
MEMORY CALL
READY FOR COPYING
99 SHEET
AUTO
EQUAL MAGNIFICATION
AUTO
DENSITY
MAGNIFICATION
SHEET
C
1
2
3
4
5
6
7
8
9
*
0

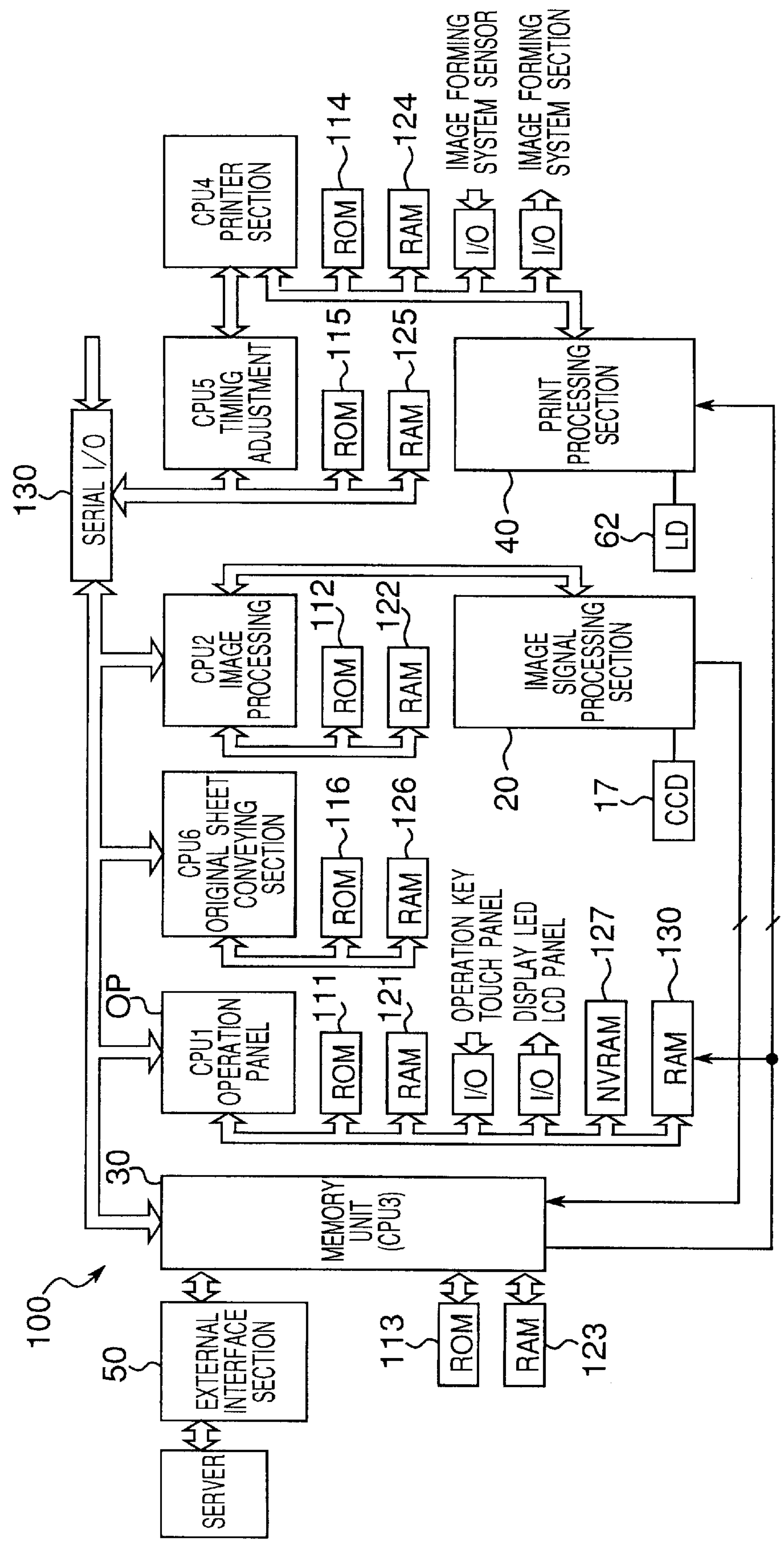
Fig.3
100
50
EXTERNAL INTERFACE SECTION
SERVER
MEMORY UNIT (CPU3)
30
113
ROM
RAM
123
CPU1 OPERATION PANEL
OP
111
ROM
121
RAM
I/O
OPERATION KEY TOUCH PANEL
I/O
DISPLAY LED LCD PANEL
NVRAM
127
RAM
130
CPU6 ORIGINAL SHEET CONVEYING SECTION
116
ROM
126
RAM
CPU2 IMAGE PROCESSING
112
ROM
122
RAM
IMAGE SIGNAL PROCESSING SECTION
20
17
CCD
130
SERIAL I/O
CPU5 TIMING ADJUSTMENT
115
ROM
125
RAM
PRINT PROCESSING SECTION
40
62
LD
CPU4 PRINTER SECTION
114
ROM
124
RAM
I/O
IMAGE FORMING SYSTEM SENSOR
I/O
IMAGE FORMING SYSTEM SECTION MEMORY UNIT 30
306
CODE MEMORY
305
311
COMPRESSOR
CODE PROCESSING SECTION
EXPANDER
312
310
EDIT PROCESSING SECTION
309
VARIABLE MAGNIFICATION PROCESSING SECTION
CPU3
304
IMAGE MEMORY
307
ROTATION PROCESSING SECTION
302
BINARY PROCESSING SECTION
308
MULTI-VALUE PROCESSING SECTION
301
SWITCHOVER SECTION
IMAGE DATA D2
IMAGE DATA D3

Fig.5A

MEMORY MANAGEMENT TABLE MT

| REGION | JOB NUMBER | PAGE NUMBER | FORWARD CONNECTION | REARWARD CONNECTION | ADDITIONAL INFORMATION |
|---|---|---|---|---|---|
| 00 | 1 | 1 | 00 | 01 | |
| 01 | 1 | 1 | 01 | FF | |
| 02 | 1 | 2 | 00 | 03 | |
| 03 | 1 | 2 | 03 | FF | |
| 04 | 2 | 1 | 00 | 05 | |
| 05 | 2 | 1 | 05 | FF | |
| 06 | 2 | 2 | 00 | 07 | |
| 07 | 2 | 2 | 07 | FF | |
| ⋮ | | | | | |

Fig.5B

CODE MEMORY

| Address | Contents |
|---|---|
| 0 | COMPRESSED DATA 1 OF PAGE 1 OF JOB 1 |
| 32K | COMPRESSED DATA 2 OF PAGE 1 OF JOB 1 |
| 64K | COMPRESSED DATA 1 OF PAGE 2 OF JOB 1 |
| 96K | COMPRESSED DATA 2 OF PAGE 2 OF JOB 1 |
| 128K | COMPRESSED DATA 1 OF PAGE 1 OF JOB 2 |
| 160K | COMPRESSED DATA 2 OF PAGE 1 OF JOB 2 |
| 192K | COMPRESSED DATA 1 OF PAGE 2 OF JOB 2 |
| 224K | COMPRESSED DATA 2 OF PAGE 2 OF JOB 2 |
| 256K | |
| ⋮ | |

CPU4
S41
INITIAL SETTING
S42
INTERNAL TIMER COUNTING START
S43
DEVELOPMENT AND TRANSFER SYSTEM CONTROL
S44
CONVEYANCE SYSTEM CONTROL
S45
FIXING SYSTEM CONTROL
S46
PRINT PROCESSING SECTION CONTROL
S47
OTHER PROCESSING
S48
IS INTERNAL TIMER COUNTING ENDED ?
NO
YES

| PAGE NUMBER | TOP-BOTTOM RECOGNITION RESULT FLAG | ROTATION FLAG | OUTPUT PERMISSION FLAG |
|---|---|---|---|
| 1 | SUCCESS | FALSE | ENABLE |
| 2 | FAILURE | UNCONFIRMED | DISABLE |
| 3 | SUCCESS | TRUE | ENABLE |
| ⋮ | ⋮ | ⋮ | ⋮ |

| PAGE NUMBER | TOP-BOTTOM RECOGNITION RESULT FLAG | ROTATION FLAG | OUTPUT PERMISSION FLAG |
|---|---|---|---|
| 1 | SUCCESS | FALSE | ENABLE |
| 2 | FAILURE | TRUE | ENABLE |
| 3 | SUCCESS | TRUE | ENABLE |
| ⋮ | ⋮ | ⋮ | ⋮ |

COPYING MACHINE, IMAGE PROCESSING APPARATUS, AND IMAGE PROCESSING METHOD FOR ORIENTING IMAGES

This application is based on application No. 2000-033367 filed in Japan, the content of which is hereby incorporated by reference.

BACKGROUND OF THE INVENTION

The present invention relates to copying machines, and in particular, to a copying machine provided with an automatic top-bottom recognizing function for automatically recognizing the top-bottom direction of the original.

In a copying machine of this type, the top-bottom direction of an original image is automatically recognized by using the read image data of the original. Then, each original image is rotated as the need arises so that the top-bottom directions of the output images become directed in a specified direction, and the obtained output images are formed on sheets (copy output).

However, the current technical level has not yet reached the stage in which the top-bottom directions of originals of all kinds can be correctly recognized. It is considerably difficult to automatically recognize the top-bottom direction of an original such as, in particular, a photographic original that has no text letter. Therefore, it is often the case where the recognition of the top-bottom direction is failed to disadvantageously cause a state of the incorrect top-bottom direction of the output image.

SUMMARY OF THE INVENTION

Accordingly, it is an object of the present invention to provide an improved copying machine or the like capable of solving the problems as mentioned above. Another object of the present invention is to provide a copying machine or the like capable of consistently direct the top-bottom directions of output images in a specified direction by supplementing an automatic top-bottom recognizing process of an original image by human determination.

In order to achieve the above object, there is provided a copying machine comprising:

a discriminating section for discriminating on the basis of information of an image of an original a top-bottom direction of the image;

a display section for displaying the image of the original when the discriminating section fails in discriminating the top-bottom direction of the image;

an interface for receiving information that is inputted by an operator and is relevant to the top-bottom direction of the image of the original displayed in the display section;

a rotation processing section that rotates or does not rotate the image of the original so that the top-bottom directions of images to be outputted become consistent according to a result of discrimination of the discriminating section and the information inputted via the interface; and an image forming section for forming on a sheet an image outputted from the rotation processing section.

Also, there is provided an image processing apparatus comprising:

an input section for inputting image data;

a discriminating section for discriminating on the basis of inputted image data a process to which the image data should be subjected;

a display for displaying an image represented by the image data when the discriminating section fails in the discrimination;

an interface for receiving information that is inputted by an operator and is relevant to the process to which the image displayed on the display should be subjected; and an image processing section for processing the image data according to a result of discrimination of the discriminating section and the information inputted via the interface.

Also, there is provided an image processing method comprising the steps of:

inputting image data;

discriminating on the basis of inputted image data a top-bottom direction of an image represented by the image data;

displaying the image represented by the image data on a display when the discrimination results in failure in the discriminating step;

receiving information that is inputted by an operator and is relevant to the top-bottom direction of the image displayed on the display; and rotating or not rotating the image so that the top-bottom directions of images to be outputted become consistent by processing the image data according to a result of discrimination in the discriminating step and inputted information in the receiving step.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a block diagram showing the construction of a control system of the above copying machine;

FIG. 5A and 5B are charts showing examples of the constructions of a memory management table and a code memory, respectively;

DETAILED DESCRIPTION OF THE PREFERRED EMBODIMENTS

A preferable embodiment of the present invention will be described in detail referring to the attached drawings.

Figure 1:
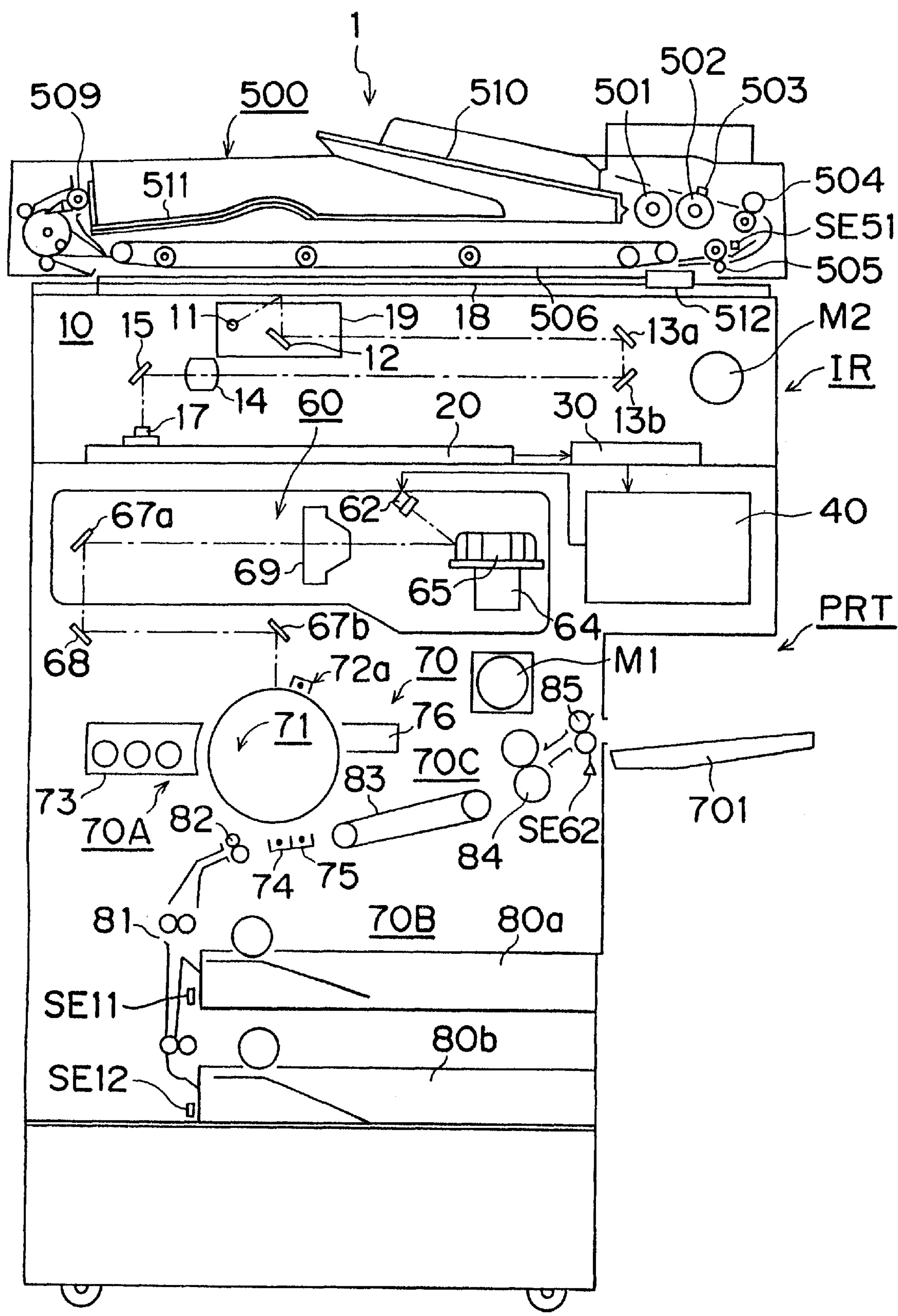
FIG. 1 is a view showing the overall construction of a copying machine according to one embodiment of the present invention.

FIG. 1 schematically shows the construction of a digital copying machine (simply referred to as a "copying machine" hereinafter) according to one embodiment of the present invention. This copying machine 1 is constructed roughly of an automatic document feeder (ADF) 500, an image reader IR and a printer PRT.

In the above-mentioned automatic document feeder 500, original sheets set on an original paper feed tray 510 are fed by a paper feed roller 501 successively from the original sheet located in the lowermost layer and separated into individual sheets by a handling roller 502 and a handling pad 503. Each of the original sheets is fed through an intermediate roller 504, subjected to skew correction by a resist roller 505 and fed onto an original table glass 18 by a conveyer belt 506. Then, the original sheet has its image read by the image reader IR described later and thereafter ejected onto a tray-shaped original discharge section 511 by an ejection roller 509. It is to be noted that the passage of the original sheet is detected by a paper feed sensor SE51.

The image reader IR has a scanning system 10 for obtaining an image signal by reading the original and an image signal processing section 20 for processing the image signal obtained by this scanning system 10. In the scanning system 10, an exposure lamp 11 and a first mirror 12 that constitute a scanner 19 are moved under the original table glass 18 by driving a scan motor M2, and light reflected on the original is taken in. The reflected light is incident on a photoelectric transducer device 17 constructed of a CCD array via second and third mirrors 13*a* and 13*b*, a condenser lens 14 and a mirror 15. The light incident on the photoelectric transducer device 17 is subjected to photoelectric conversion and outputted as an image signal. The image signal processing section 20 subjects the image signal outputted from the photoelectric transducer device 17 to A/D (analog-to-digital) conversion and quantizes the resulting signal into 8-bit image data every pixel. Then, the image data is subjected to the image processing of shading compensation, magnification, image quality correction and so on, and the obtained image data is outputted to a memory unit 30 that serves as an image storage section.

The image data obtained through the image processing are successively stored into the memory unit 30 concurrently with the reading of each original sheet. The memory unit 30 will be described in detail later.

The printer unit PRT has a print processing section 40, an optical system 60 and an image forming system 70. A copy receiving tray 701 is provided on a side of the main body while protruding sideward of the main body.

The print processing section 40 drives the optical system 60 on the basis of the image data from the memory unit 30. In the optical system 60, a semiconductor laser device 62 emits laser light on the basis of a signal controlled by the print processing section 40. This laser light is reflected on a polygon mirror 65 rotated by a motor 64, deflected by a main lens 69, reflected on turnback mirrors 67*a*, 68 and 67*b* and irradiated on a photoreceptor drum 71.

The image forming system 70 is provided with a development transfer system 70A, a conveyance system 70B and a fixing system 70C.

In the development transfer system 70A, the surface of the photoreceptor drum 71 that is rotated counterclockwise by the main motor M1 in FIG. 1 is uniformly charged by an electrostatic charger 72*a*. Subsequently, the laser light from the optical system 60 is irradiated on the surface of the photoreceptor drum, and an electrostatic latent image is formed there. Subsequently, toner is made to adhere to the electrostatic latent image by a developer 73 to form a toner image. The toner image on the surface of this photoreceptor drum is transferred by a transfer charger 74 onto the surface of a sheet (the conveyance system 70B will be described later) conveyed through a transfer position between the photoreceptor drum 71 and the transfer charger 74. The sheet on which the image has been transferred is separated from the surface of the photoreceptor drum upon receiving AC discharge by a separation charger 75. The surface of the photoreceptor drum is cleaned after the transfer by a cleaning device 76.

In the conveyance system 70B, sheets of a size designated by an operation panel OP or the like are fed one by one from either one of sheet supply cassettes 80*a* and 80*b*. It is to be noted that the sizes of the sheets stored in the sheet supply cassettes 80*a* and 80*b* have preparatorily been detected by size detection sensors SE11 and 12. Each sheet fed from the sheet supply cassette 80*a* or 80*b* is conveyed to a timing roller 82 through a sheet guide 81. Then, the sheet once stands by in the place of the timing roller 82 and is thereafter fed into the aforementioned transfer position in synchronization with image formation on the surface of the photoreceptor drum, so that a toner image is transferred onto the sheet. The sheet that has received the toner transferred and is separated from the surface of the photoreceptor drum is conveyed to a fixing roller pair 84 by a conveyer belt 83.

In the fixing system 70C, the toner is fixed onto the sheet by being heated and pressured by the fixing roller pair 84. Subsequently, the sheet is ejected onto the copy receiving tray 701 by an ejection roller pair 85. It is to be noted that the sheet to be ejected is detected by an ejection sensor SE62.

Figure 2:
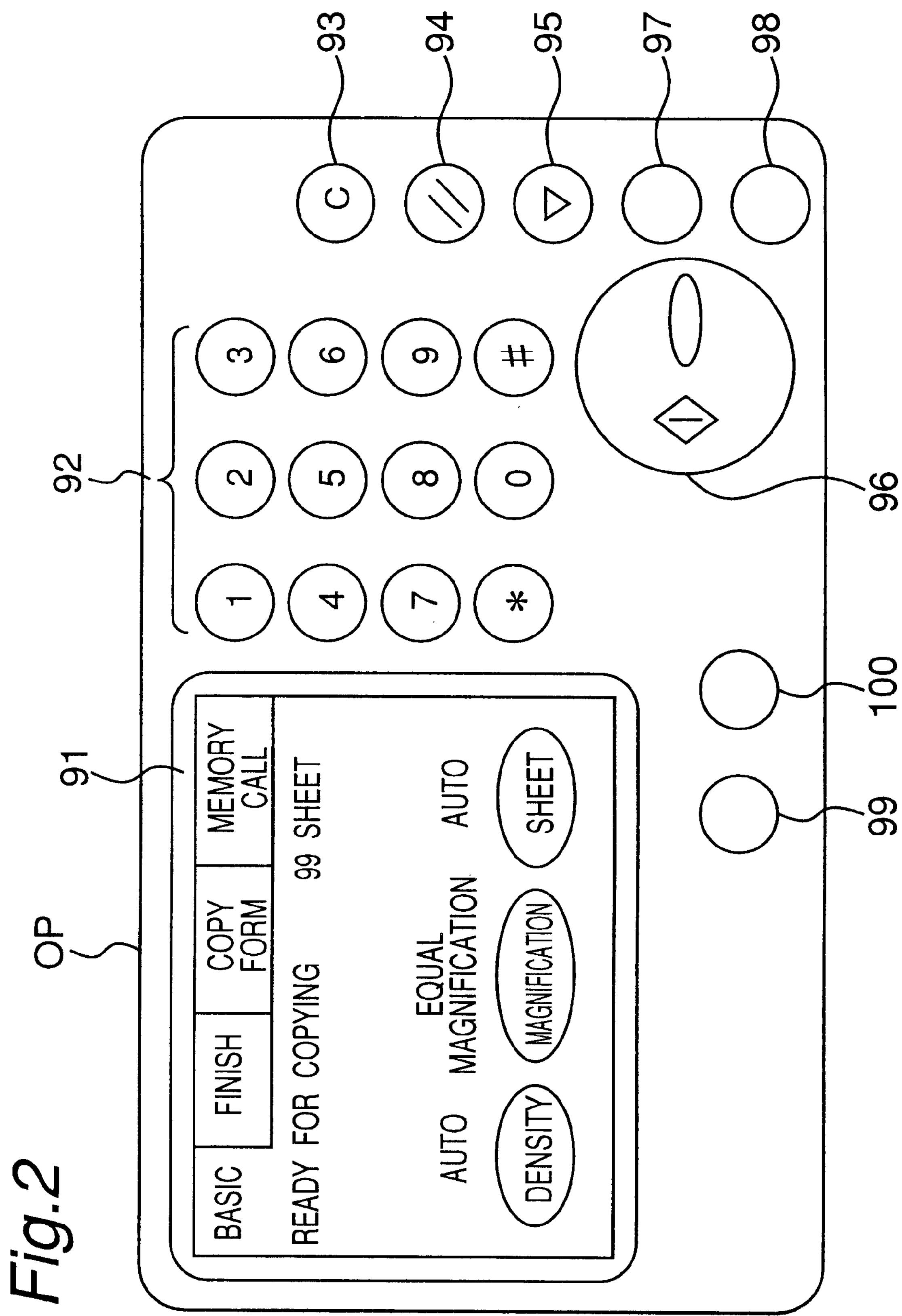
FIG. 2 is a view showing the construction of an operation panel section of the above copying machine.

FIG. 2 shows the construction of the operation panel OP provided in an upper portion of the main body of this copying machine 1. This operation panel OP is provided with an LCD touch panel 91, a ten-key section 92 for inputting a setting number such as the number of copies, a magnification ratio and a telephone number of the destination of FAX transmission, a clear key 93 for resetting the setting number or the like to a default value of "1", a panel reset key 94 for resetting the setting value set in the copying machine to the default value, a stop key 95 for stopping operation, a start key 96 for starting operation, an interrupt key 97 for executing another operation by interrupting in operation, an application changeover key 98 for changing the display on the LCD touch panel 91 according to the application of copying, facsimile or the like, a network key 99 for utilizing the function of a device connected to a network and registering a device on the network and a job management key 100 for managing jobs that are being processed or awaited for the processing thereof.

The LCD touch panel 91 displays copying operation states of the copying machine of an exposure level, a magnification ratio, a recording sheet size and so on, facsimile operation states of a facsimile transmission destination, a transmission mode and so on, various abnormal states of the occurrence of jam, the occurrence of service personnel call, the occurrence of paper emptiness and so on and other pieces of information and permits an input for designating the operation mode. Moreover, by touching the displayed touch panel key, another screen (basic setting screen/finish setting screen/copy form setting screen), which is not shown in this figure, can be opened to allow the setting of another mode. Through the processing described later, if automatic top-bottom recognition of the original image has been failed, then a reduced image and the like of the original are displayed on the LCD touch panel 91 in order to prompt the operator to input top-bottom information.

FIG. 3 shows the block construction of a control system 100 of this copying machine 1. The control section 100 is constructed principally of six central processing units CPU1 through CPU6. The CPU1 through CPU6 are provided with ROM111 through ROM116 that store the respective operation programs and RAM121 through RAM126 that become work areas for executing the programs. Serial communications are executed by interrupt among the CPU1 through CPU6 via a serial I/O 130, transmitting and receiving commands, reports and other data.

The CPU1 controls the operation panel OP while receiving inputs from various operation keys of the operation panel OP via I/O (input/output interface) and executes control of a display output to the LCD touch panel 91 that serves as a display section. It is to be noted that the setting of the initial mode and the user mode, total counter and the counter of each item and telephone directory information in a facsimile application operation and so forth on the operation panel are stored in an NVRAM 127. The reduced original image data to be displayed on the LCD touch panel 91 when the automatic top-bottom recognition described later has failed is temporarily stored in a RAM 130.

The CPU2 executes control of each section of the image signal processing section 20 and drive control of the scanning system 10.

The CPU3 once stores the read image data and the image data inputted from the external interface section into memories (an image memory 304 and a code memory 306 described later) by controlling the memory unit 30. Then, the CPU3 reads the stored image data based on instructions and outputs the data to the print processing section 40 or the external interface section 50. It is to be noted that the external interface section 50 executes transform of a network signal and executes data transfer between the server and the memory unit 30.

The CPU4 executes control of the print processing section 40, the optical system 60 and the image forming system 70. Signals from size detection sensors SEll and SE12 shown in FIG. 1 are inputted as a signal of an image forming system sensor to the CPU4 via I/O. By this operation, the sheet size is discriminated.

The CPU5 executes processing for overall timing adjustment of the control system 100 and operation mode setting and processing relevant to the facsimile function.

The CPU6 controls the automatic document feeder 500, thereby transferring one by one a plurality of original sheets placed on the original document tray 510 to a specified position on the original document glass according to timing instructions from the CPU5. The original sheet on the original document glass is ejected onto the original document receiving tray 511 under instructions from the CPU5.

Figure 4:
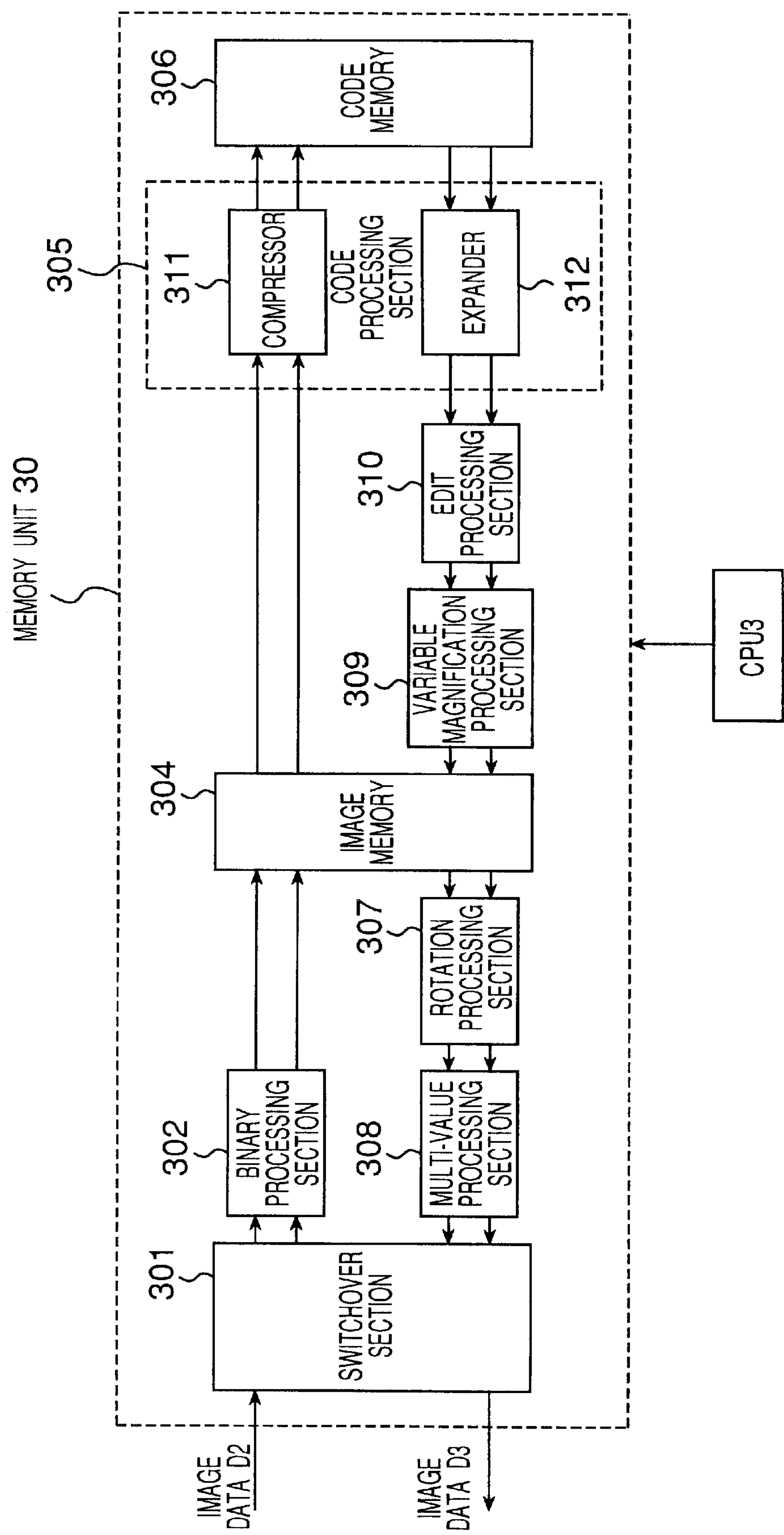
FIG. 4 is a block diagram showing the construction of a memory unit 30.

FIG. 4 shows the block construction of the memory unit 30. The memory unit 30 is provided with a switchover section 301 for switching over between write and read of image data, a binary processing section 302 for forming. binary data based on the parameter setting from the CPU3, a multi-port image memory 304 having a capacity of one page of A3 size at 400 dpi, a code processing section 305 having a compressor 311 and an expander 312, which can individually operate parallel, a multi-port code memory 306 having a plurality of memory regions in units of 32 Kbytes, a variable magnification processing section 309 for executing expansion or reduction of output image data, an edit processing section 310 for executing frame exterior deletion and decoration processing, a rotation processing section 307 that rotates or does not rotate the image data under instructions from the CPU3 and a multi-value processing section 308 for forming multi-value data based on parameter setting from the CPU3.

As indicated by the rightward directed arrow in FIG. 4, image data D2 inputted through the switchover section 301 is converted into binary data by the binary processing section 302 and written into a region that is located in the image memory 304 and designated by the CPU3. If the image data D2 is written into the image memory 304, then the CPU3 reads the image data from image memory 304 so as to execute the process of forming code data by compressing the read image data by the compressor 311 of the code processing section 305. While forming a memory management table MT in the RAM 123 concurrently with the above operation, the code data is stored into the code memory 306 by DMA transfer according to the contents of the memory management table MT. As shown in FIG. 5A by way of examples, the memory management table MT stores numbers that represent the memory regions (in units of 32 Kbytes) of the code memory 306, a job number and a page number and stores the numbers of connected memory regions when a page is divided into a plurality of memory regions. In the item of "forward connection",the digits "00" represent the first memory region allocated to the page, and the other digits represent the number of the memory region that is forwardly connected to the memory region. On the other hand, in the item of "rearward connection", the digits "FF" represent the last memory region allocated to the page, and the other digits represent the number of the memory region that is rearwardly connected to the memory region. Further, this memory management table MT stores a compression system and a variety of additional information necessary for compressing and expanding data length and so on. FIG. 5B shows a state in which code data are stored in the memory regions (in units of 32 Kbytes) of the code memory 306 in correspondence with the contents of the memory management table MT shown in FIG. 5A.

Conversely, when outputting the image data, as indicated by the leftward directed arrow in FIG. 4, the CPU3 reads the code data from the code memory 306 by DMA transfer and expands the read code data by the expander 312 of the code processing section 305, further executes edit processing by the edit processing section 310 as the need arises, changes the magnification ratio in the variable magnification processing section 309 as the need arises and writes the resulting data into a region that is located in the image memory 304 and designated by the CPU3. If the page combining for outputting a plurality of images as the image of one page is executed, then the image of another page is written into a region that is located in the image memory 304 and designated by the CPU3 so as to form the data of one page to be outputted. If the image data of one page is formed in the image memory 304, then the image is subjected to necessary rotation processing in the rotation processing section 307 under instructions from the CPU3, and thereafter, multi-value image data is formed by the multi-value processing section 308. Then, the multi-value data is outputted as image data D3 through the switchover section 301. It is to be noted that the information in the memory management table MT is deleted when the required number of copies of the information of the page are entirely normally ejected.

Figure 6:
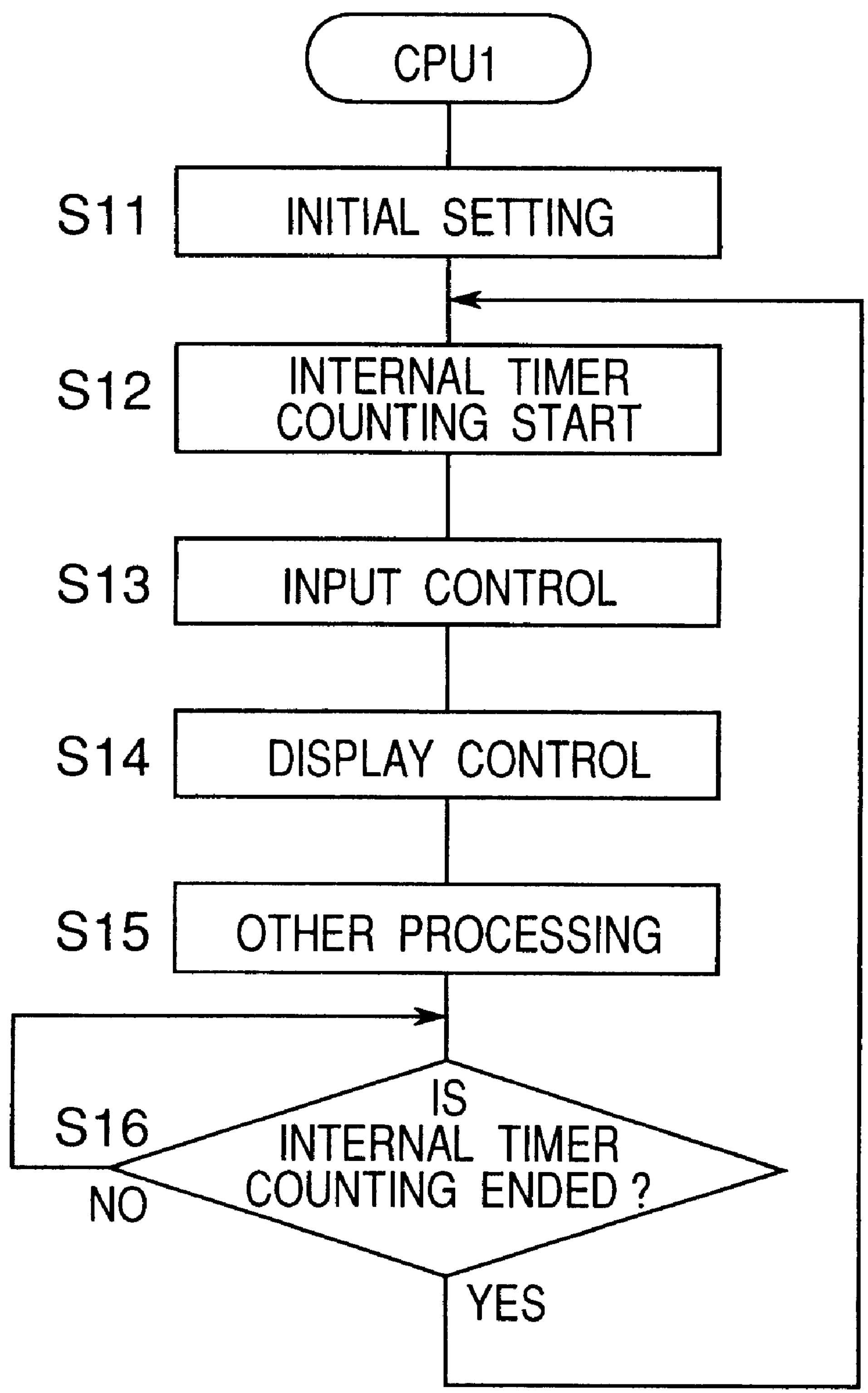
FIG. 6 is a flowchart of the main routine of a CPU1.

FIG. 6 shows the flow of the main routine executed by the CPU1. First, initial setting is executed (S11), and an internal timer for making constant the processing time of one routine is set to start time counting (S12). Next, a control process (S13) of input signals from various switches of the operation panel OP and various sensors inside the copying machine, a display control process (S14) of the LCD panel on the operation panel OP and a display device or the like and a control process (S15) of other internal mechanisms are executed. Completion of the time counting of the internal timer is awaited (S16), and the program flow returns to step S12.

Figure 7:
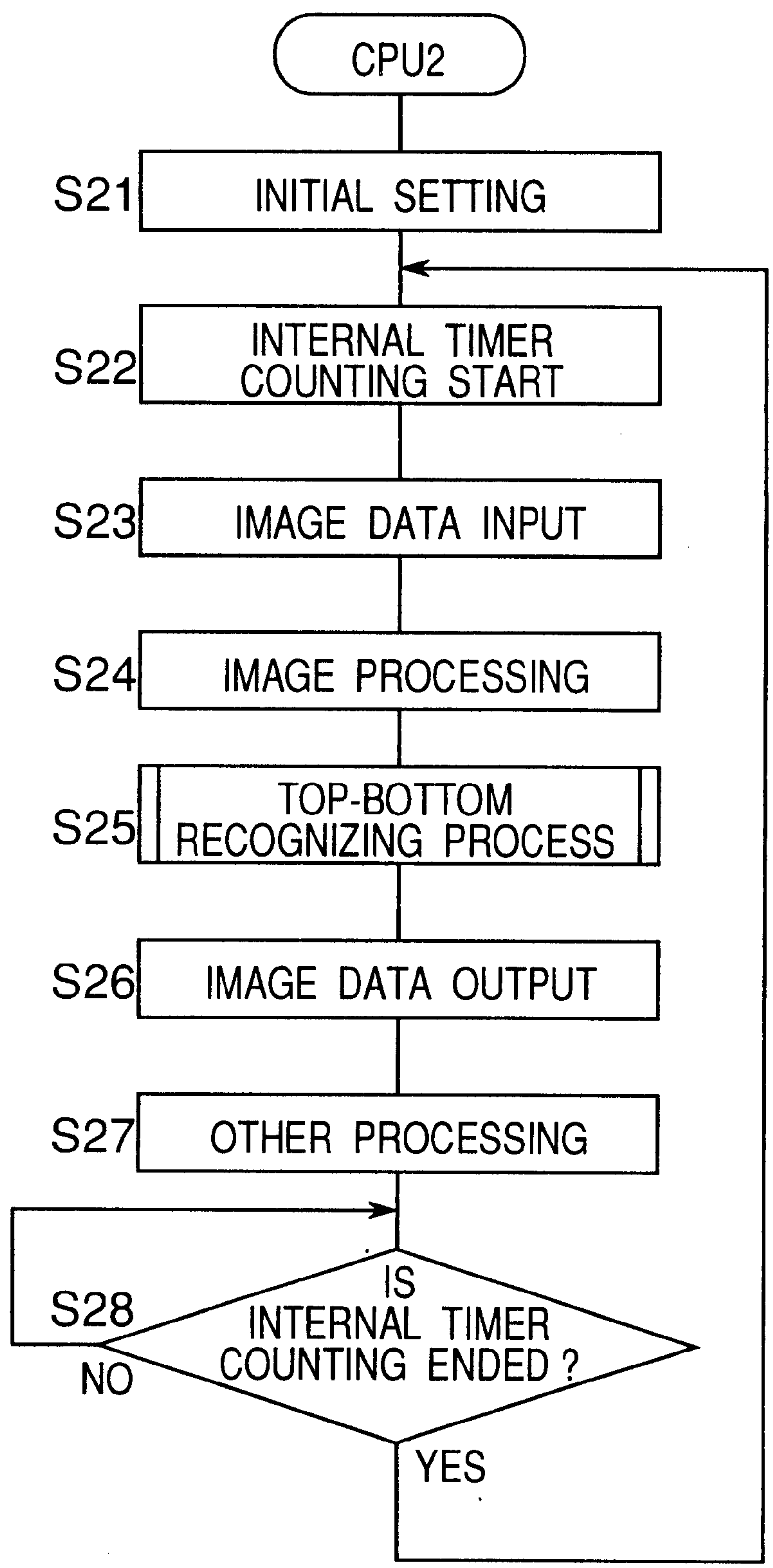
FIG. 7 is a flowchart of the main routine of a CPU2.

FIG. 7 shows the flow of the main routine executed by the CPU2. First, initial setting is executed (S21), an internal timer is set to start time counting (S22) and an image data input process is executed (S23). Subsequently, image processing (S24), a top-bottom recognizing process (S25), an image data output process (S26) and other processes are executed (S27). Subsequently, completion of the time counting of the internal timer is awaited (S28), and the program flow returns to step S22.

Figure 8:
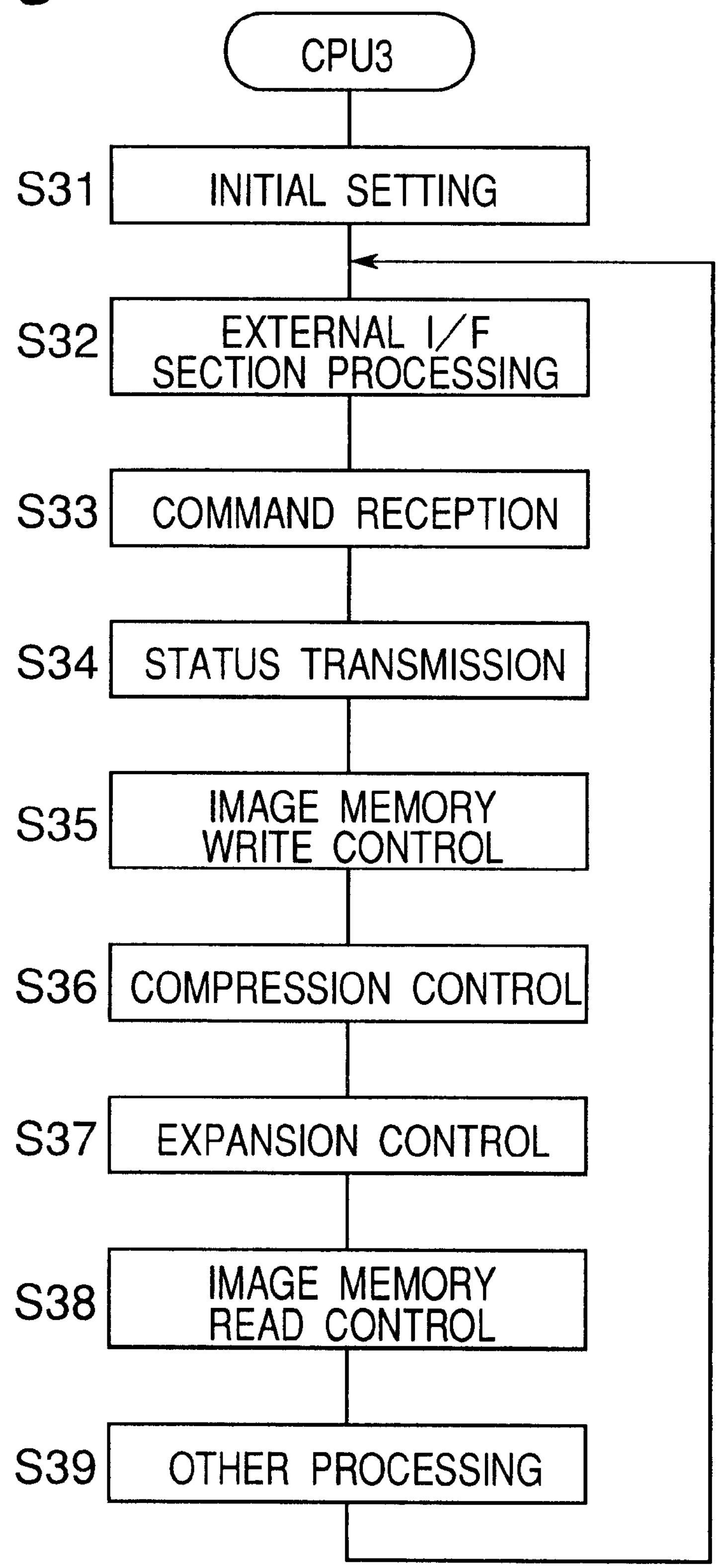
FIG. 8 is a flowchart of the main routine of a CPU3.

FIG. 8 shows the flow of the main routine executed by the CPU3. First, initial setting is executed (S31), and processing in the external interface section is executed (S32) to execute a process of receiving commands from the other CPU's (S33) and a status transmitting process (S34). Further, control of writing into the image memory (S35), compression control (S36), expansion control (S37), a process of reading from the image memory (S38) and other processes (S39), and the program flow returns to step S32.

Figure 9:
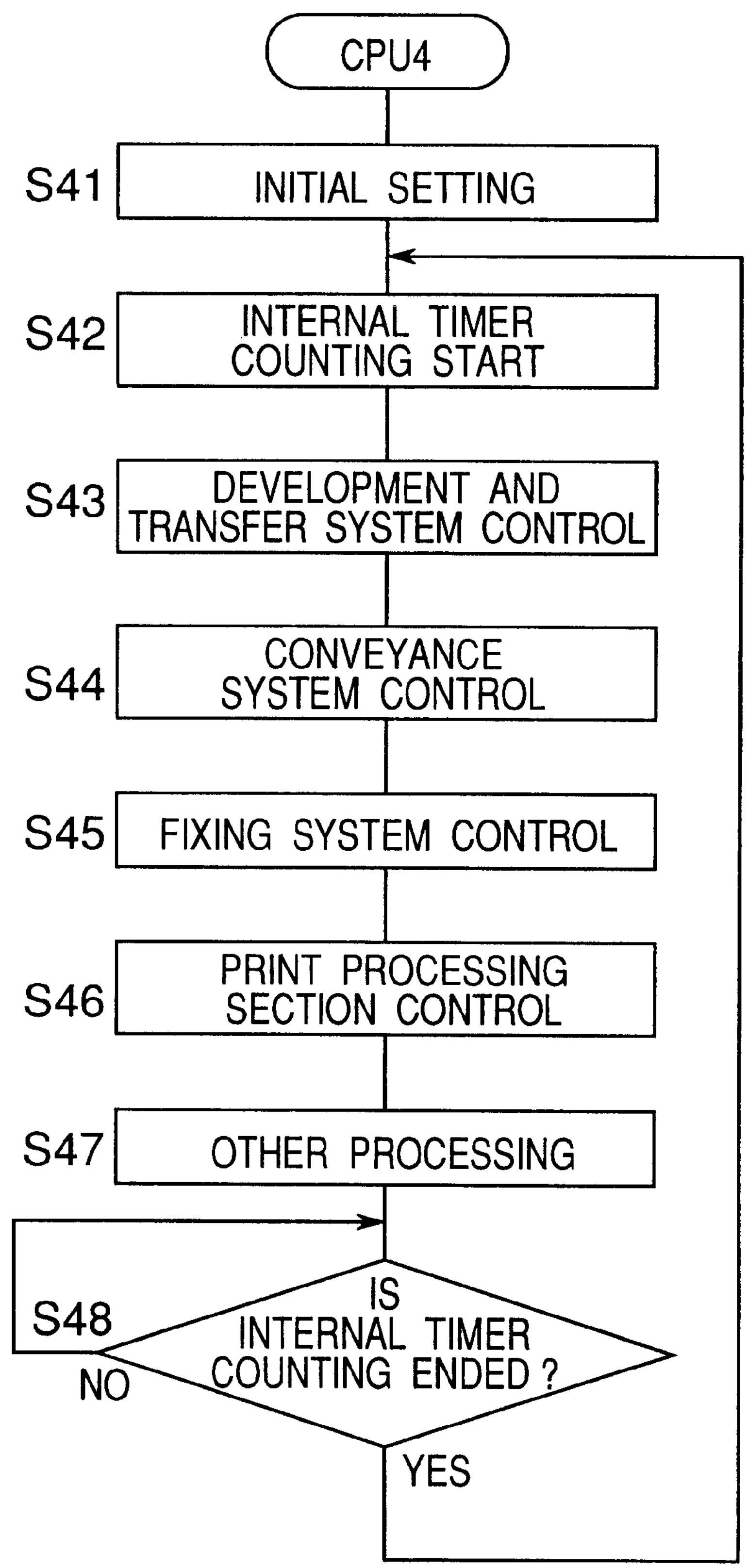
FIG. 9 is a flowchart of the main routine of a CPU4.

FIG. 9 shows the flow of the main routine executed by the CPU4. First, initial setting is executed (S41), and an internal timer is set to start time counting (S42). Subsequently, control of the development transfer system (S43), control of the conveyance system (S44), control of the fixing system (S45), control of the print processing section (S46) and other processes are executed (S47). Subsequently, completion of the time counting of the internal timer is awaited (S48), and the program flow returns to step S42.

Figure 10:
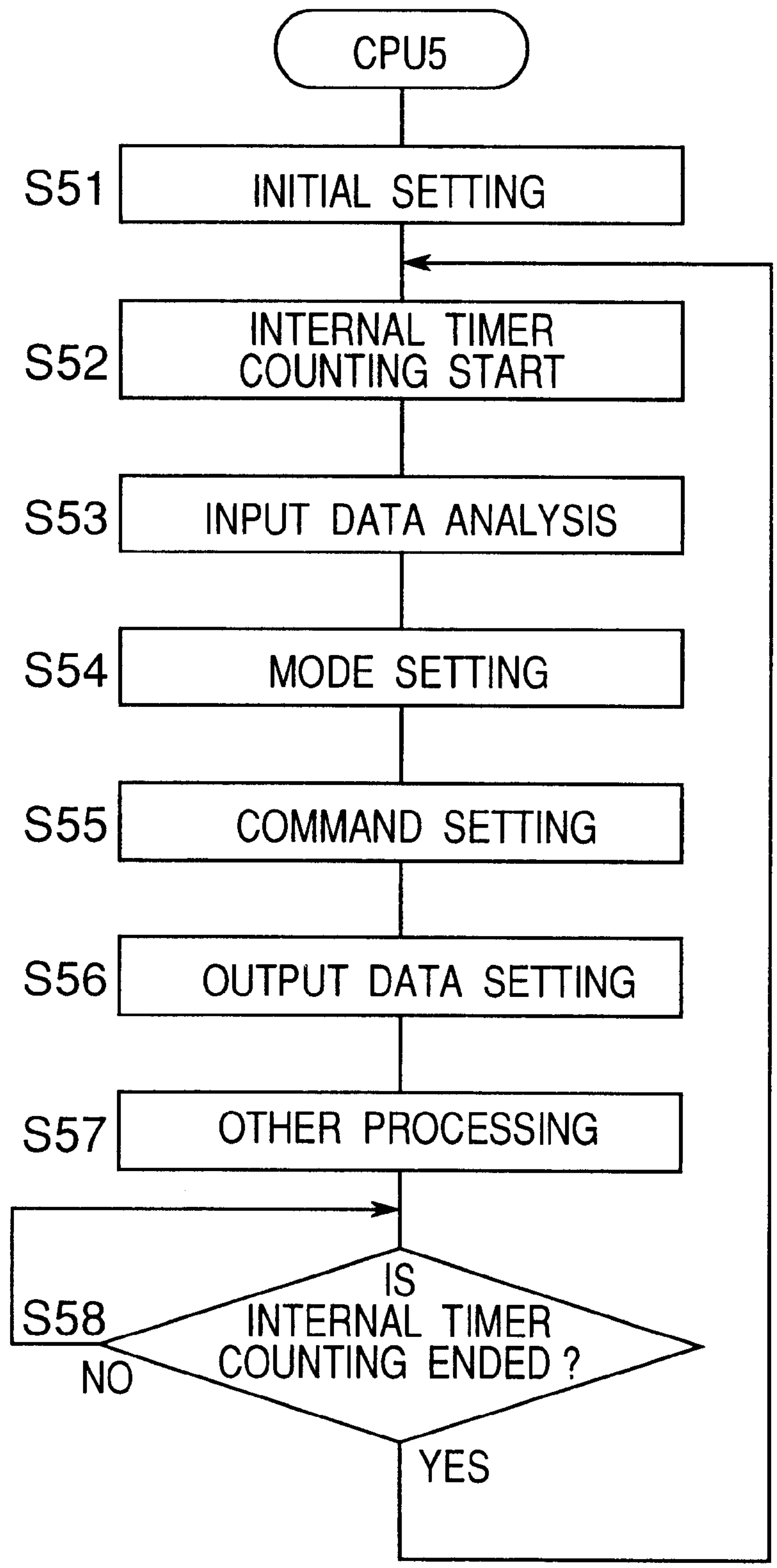
FIG. 10 is a flowchart of the main routine of a CPU5.

FIG. 10 shows the flow of the main routine executed by the CPU5. First, initial setting is executed (S51), and an internal timer is set to start time counting (S52). The contents of various data inputted by interrupt are analyzed (S53), and a mode setting process is executed when a change of the operation mode occurred (S54). Next, a command setting process for controlling the writing into the image memory or controlling the reading from the image memory is executed according to the set copying mode (S55). Next, the data to be outputted by the interrupt process is set (S56), and other processes are executed (S57). Subsequently, completion of the time counting of the internal timer is awaited (S58), and the program flow returns to step S52.

Figure 11:
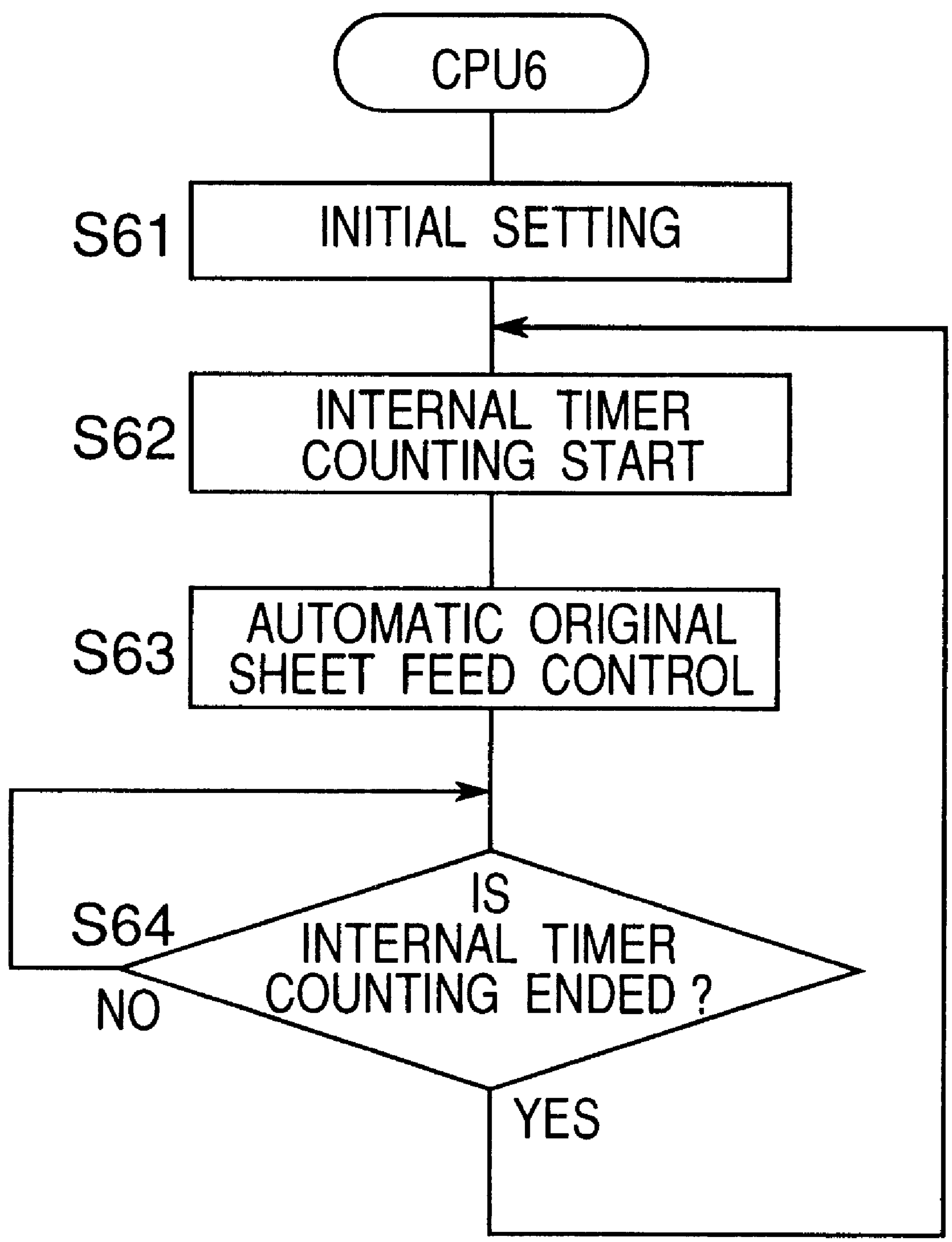
FIG. 11 is a flowchart of the main routine of a CPU6.

FIG. 11 shows the flow of the main routine executed by the CPU6. First, initial setting is executed (S61), and an internal timer is set to start time counting (S62) and execute control of the automatic document feeder (ADF) (S63). Subsequently, completion of the time counting of the internal timer is awaited (564), and the program flow returns to step S62.

Figure 15A:
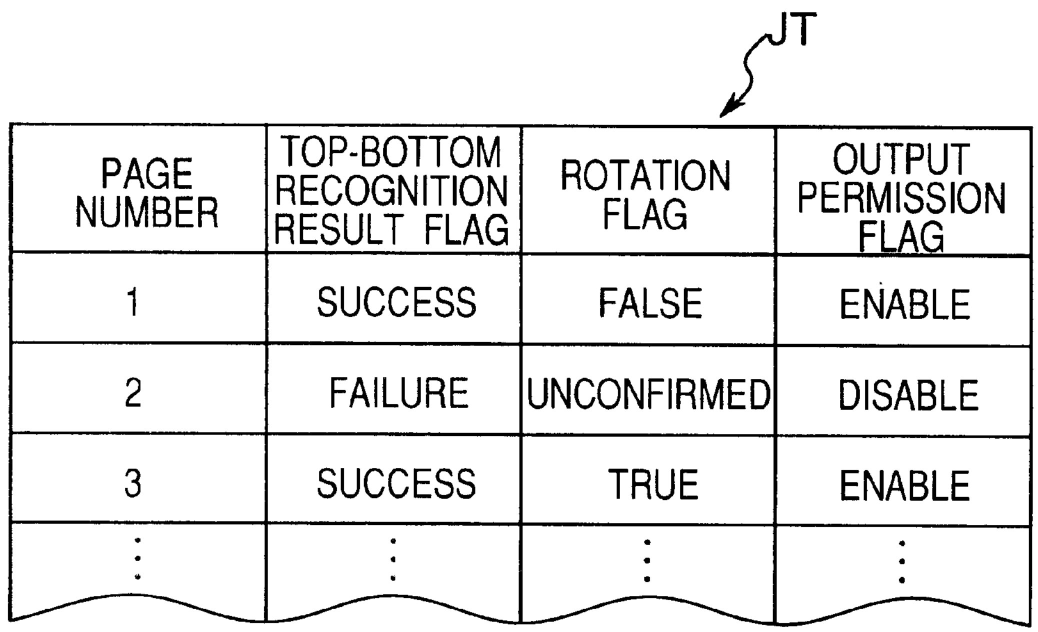
FIGS. 15A and 15B are charts showing examples of the construction of the job table.
Figure 15B:
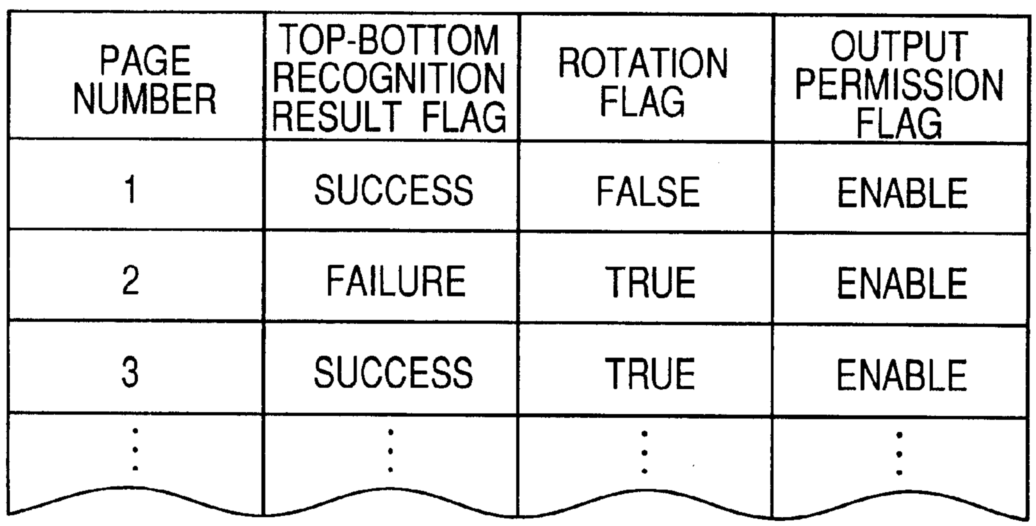

FIG. 15A shows the construction of a "job table" JT to be managed by the CPU5 to set the top-bottom directions of the output images in a specified direction. In this job table JT, the page number of an original sheet, the state of a top-bottom recognition result flag that indicates the top-bottom recognition result of the image of the original sheet, the state of a rotation flag that indicates whether or not to rotate the image of the original sheet and the state of an output permission flag that indicates whether or not to permit copy output of the original sheet are registered in association. The item of "success" of the top-bottom recognition result flag indicates that the automatic top-bottom recognition of the original sheet has succeeded and the top-bottom recognition result has been established, while the item of "failure" indicates that the automatic top-bottom recognition of the original sheet has failed. The item of "true" of the rotation flag indicates that the image of the original sheet is rotated, while the item of "false" indicates that the image of the original sheet is not rotated. The item of "unconfirmed" of the rotation flag indicates that whether the image of the original sheet is to be rotated or to be not rotated has not yet been determined. The item of "enable" of the output permission flag indicates that copy output of the original sheet is enabled, while the item of "disable" indicates that the copy output of the original sheet is disabled.

Figure 12:
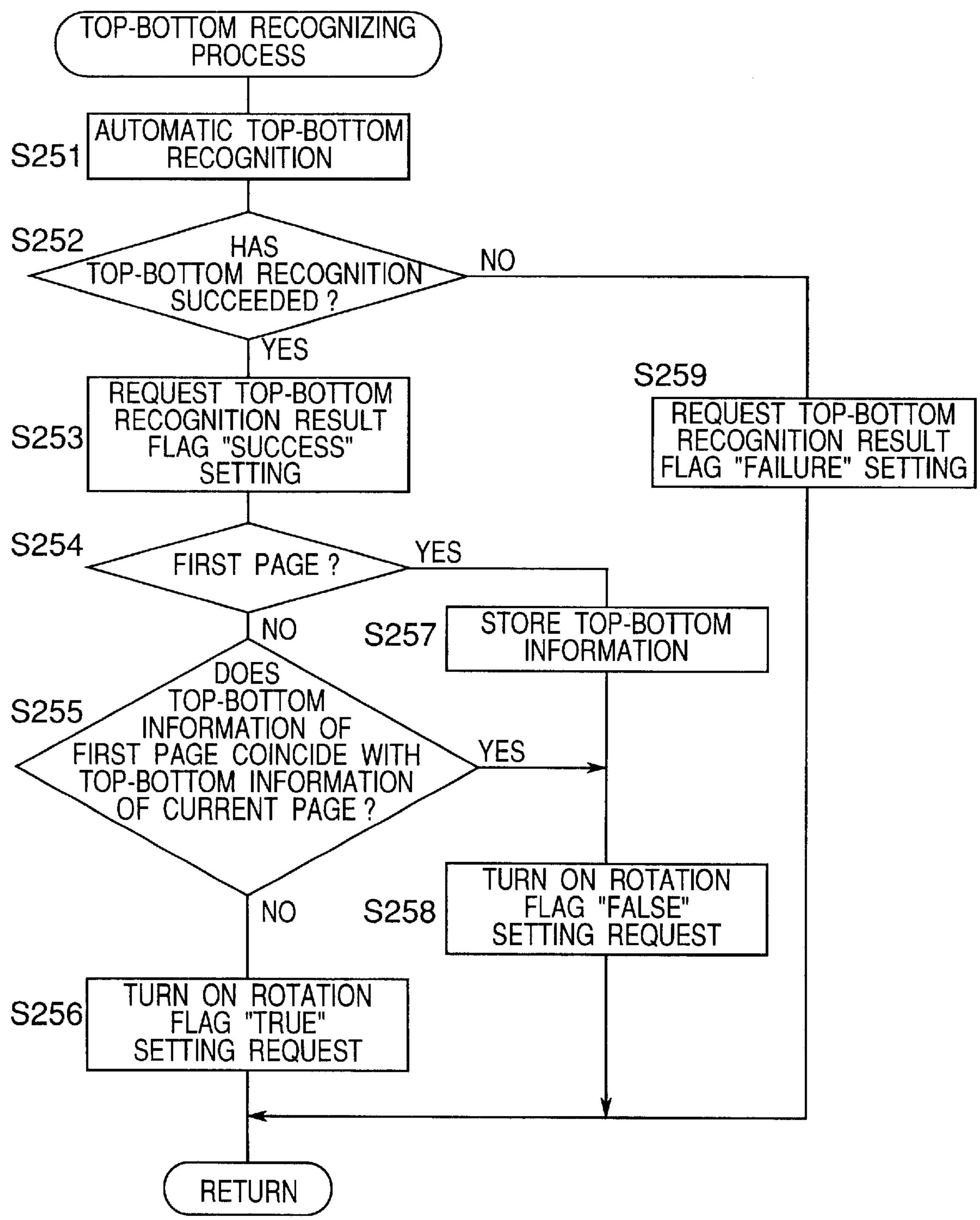
FIG. 12 is a flowchart of the detail of a top-bottom recognizing process executed by the CPU2.

FIG. 12 shows the detailed flow of the top-bottom recognizing process (S25 of FIG. 7) executed by the CPU2. First, the CPU2 executes the automatic top-bottom recognizing process by a well-known method based on image information obtained by reading the original of a certain page (S251). Subsequently, it is determined whether the automatic top-bottom recognition of the original image has succeeded (S252). If it is determined that the top-bottom recognition of the original image has succeeded, then a top-bottom recognition result flag "success" setting request is turned on to register the above-mentioned fact in the job table JT (S253). Subsequently, it is determined whether or not the original image is the first page (S254). If it is determined that the original image is the first page, then the top-bottom information of the original sheet of the first page is stored into the RAM (S257). With regard to the original sheet of the first page, of which the direction of the original image becomes a reference, is not required to be rotated, and therefore, a rotation flag "false" setting request is turned on (S258). If it is determined that the original image is not the first page in step S254, then the top-bottom information of the original image of the first page preparatorily stored in the RAM and the top-bottom information of the original image of the page that is currently subjected to the processing, (this page being referred to as a "current page") are compared with each other (S255). If both are the same, then the rotation flag "false" setting request of the original image of the current page is turned on (S258) since the original image of the current page is not required to be rotated. If both are not the same, then a rotation flag "true" setting request of the original image of the current page is turned on (S256) since the original image of the current page is required to be rotated in order to unify the top-bottom directions of the output images. If it is determined that the top-bottom recognition of the original image has failed in step S252, then a top-bottom recognition result flag "failure" setting request is turned on in order to register the above-mentioned fact in the job table JT (S259). Then, the program flow returns to the main routine.

Figure 13:
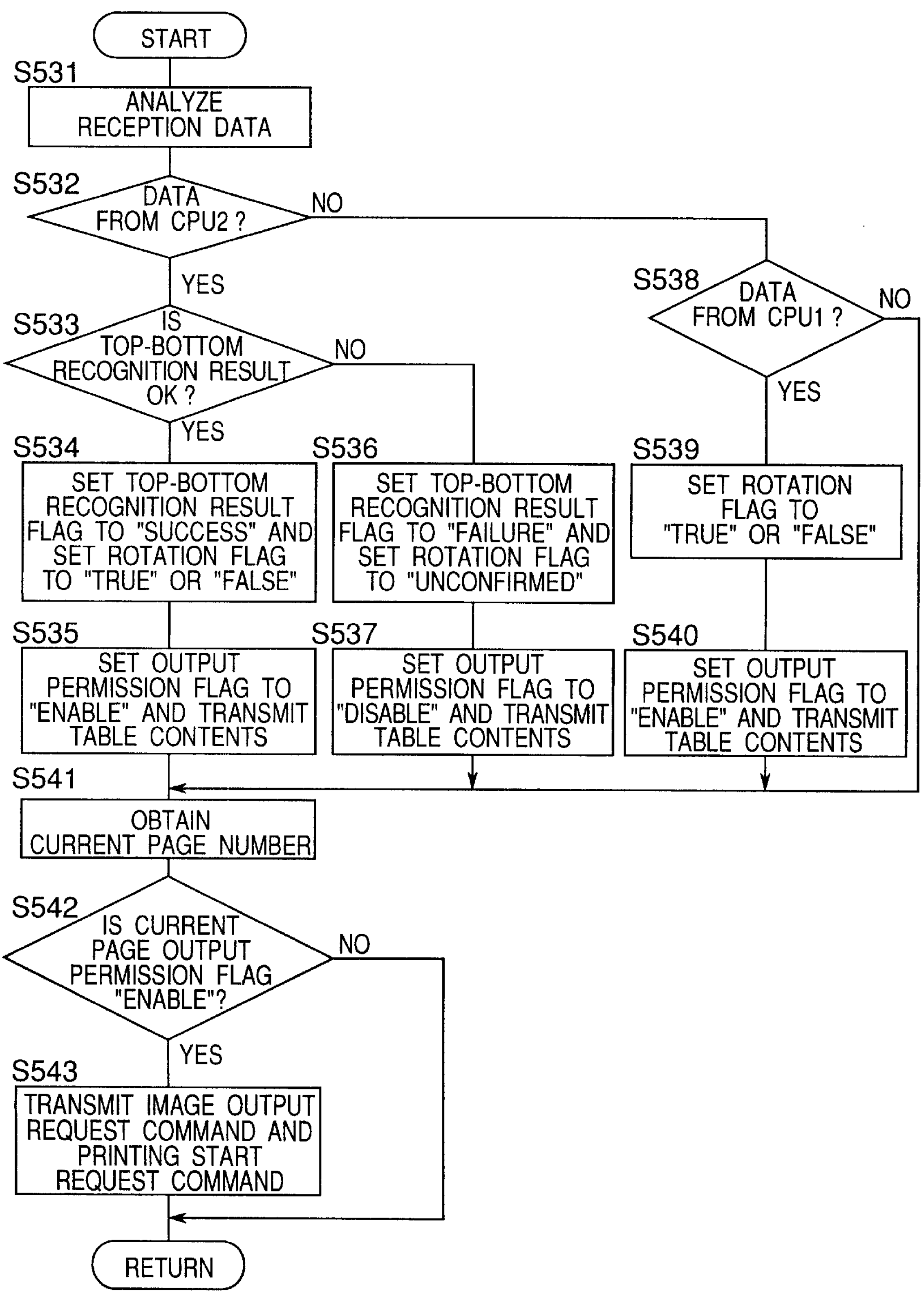
FIG. 13 is a flowchart showing the detailed of control by the CPU5 for executing copy output based on the contents of a job table while updating the contents of the job table.

FIG. 13 shows the detailed flow of the control executed by the CPU5 to execute copy output based on the contents of the job table JT while updating the contents of the job table JT. First, the CPU5 executes a reception data analyzing process (S531) to determine whether or not the received data is the data from the CPU2 (S532). If the received data is the data from the CPU2, then it is determined whether or not the data includes a top-bottom recognition result flag "success" setting request (S533). If the top-bottom recognition result flag "success" setting request is included, then the top-bottom recognition result flag of the job table JT is set to "success",and the rotation flag of the job table JT is set to "true" or "false" according to the contents of the rotation flag setting request that is concurrently received (S534). Subsequently, the output permission flag is set to "enable" in accordance with the establishment of the state of the top-bottom recognition result flag and the rotation flag, and the contents of the job table JT are transmitted to the CPU1 and the CPU3 (S535). Conversely, if the data received in step S532 includes the top-bottom recognition result flag "failure" setting request, then the top-bottom recognition result flag of the job table JT is set to "failure". Since it is indefinite whether the original image should be rotated or should not be rotated in this stage, the rotation flag of the job table JT is assumed to be "unconfirmed" (S536). Subsequently, the output permission flag is set to "disable" in accordance with the fact that the rotation flag is in the "unconfirmed" state, and the contents of the job table JT are transmitted to the CPU1 and the CPU3 (S537). If the received data is not the data from the CPU2 (S532) but the data from the CPU1 (S538), which means a rotation flag setting request (described later) from the CPU1, then the rotation flag of the job table JT is set to "true" or "false" according to the contents of the received rotation flag setting request (S539). Subsequently, the output permission flag is set to "enable" in accordance with the fact that the rotation flag is in the "established" state, and the contents of the job table JT are transmitted to the CPU1 and the CPU3 (S540). As described above, the CPU5 updates the contents of the job table JT on the basis of the top-bottom recognition result flag setting request and the rotation flag setting request from the CPU2 or the rotation flag setting request from the CPU1. Subsequently, the CPU5 obtains the number of the current page (S541). If the output permission flag of the current page is in the "enable" state (S542), then the CPU5 requests the reading of the image data from the memory unit 30 by transmitting an image output request command to the CPU3 and transmits a printing start request command to the. CPU4 to start the print operation of the printer unit PRT (S543).

Figure 16A:
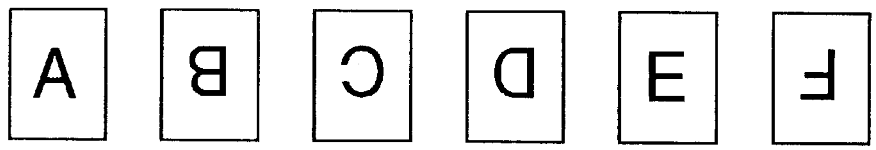
FIGS. 16A and 16B are views of read original images and output images shown by way of comparison.
Figure 17:
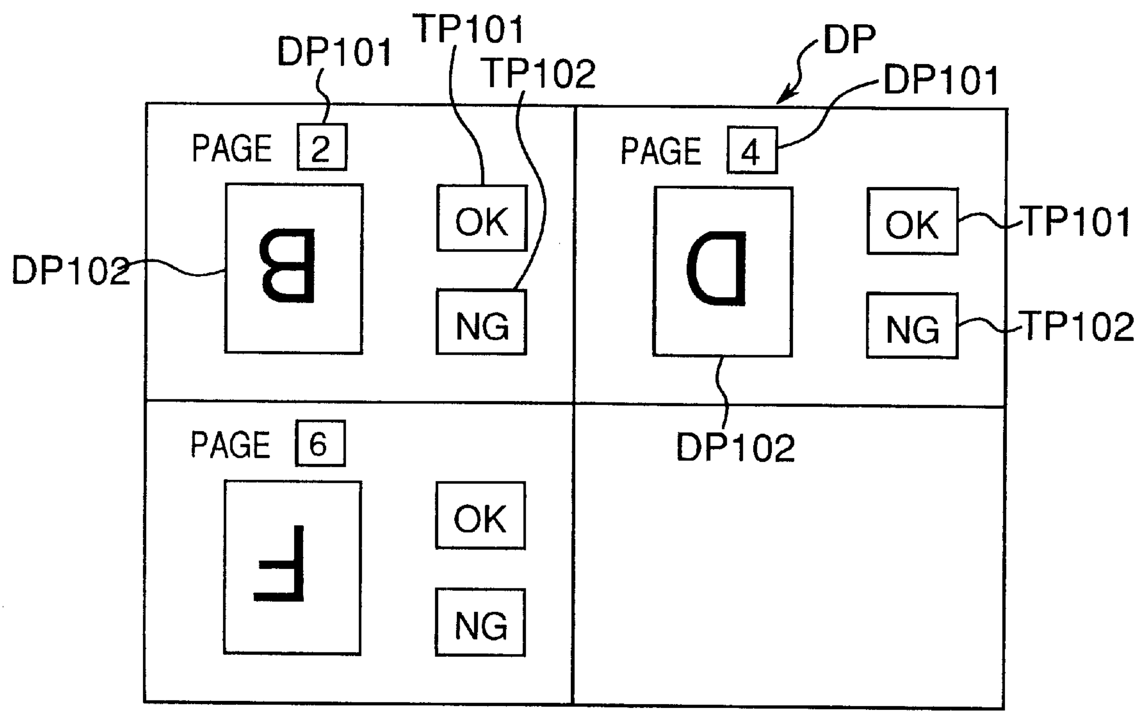
FIG. 17 is a view showing an example of reduced images and so on of original sheets of which the automatic top-bottom recognition has failed.

As shown in, for example, FIG. 16A, it is assumed that, when the top-bottom directions of the read original images are in a state in which the directions of the second page, the third page and the fourth page are reversed, the direction of the fifth page is the same and the direction of the sixth page is reversed with regard to the direction of the first page, the original image automatic top-bottom recognition process (step S251 in FIG. 12) has failed with regard to the second page, the fourth page and the sixth page. Upon receiving the contents of the job table JT indicating that the rotation flag is "unconfirmed" and the output permission flag is "disable" from the CPU5 in step S537 in FIG. 13, the CPU1 controls the operation panel OP to display a selection screen DP as shown in FIG. 17 on the LCD touch panel 91. This selection screen DP is divided into four blocks in a checkered pattern in this example. Each block includes a section DPlO1 for displaying the page number of the original sheet of which the automatic top-bottom recognition has failed, a section DP102 for displaying a reduced image of the original sheet and an "OK" key TP101 and an "NG" key TP102 that serve as input means by which the operator inputs the top-bottom information of the image. The operator realizes that the automatic top-bottom recognition has failed with regard to the original sheets of which the page numbers and the reduced images are displayed by viewing the display of each block. The operator is prompted to touch the "OK" key TP101 when the top-bottom direction of the image is correct or touch the "NG" key TP102 when the top-bottom direction of the image is incorrect with regard to each displayed original sheet. For example, if the selection screen DP shown in FIG. 17 is displayed, then the operator is prompted to touch the "NG" key TP102 with regard to the second page, the fourth page and the sixth page since the reduced images of the second page, the fourth page and the sixth page all have reversed top-bottom directions.

In this stage, the page number of the original is displayed together with the reduced image of each original sheet of which the automatic top-bottom recognition has failed. Therefore, if the operator cannot determine the top-bottom direction of the image by merely viewing the reduced image, then the original sheet can be directly confirmed on the basis of the page number of the original sheet. Therefore, the operator is able to easily determine the top-bottom direction of the image and immediately determine whether the "OK" key TP101 or the "NG" key TP102 should be touched. This can improve the convenience of the operator and prevent the productivity of copy output from being degraded.

The event that the "OK" key TP101 or the "NG" key TP102 is touched is inputted to the CPU1 as top-bottom information that represents the top-bottom direction of the image. The original image is not required to be rotated when the "OK" key TP101 is touched, and accordingly, the CPU1 transmits the rotation flag "false" setting request to the CPU5. The original image is required to be rotated when the "NG" key TP102 is touched, and accordingly, the CPU1 transmits the rotation flag "true" setting request to the CPU5.

If neither the "OK" key TP101 nor the "NG" key TP102 is touched within a specified time measured by the internal timer from a reduced image display time point (or an original read end time point) of the original sheet, then the CPU1 transmits the rotation flag "false" setting request to the CPU5 on the assumption that the top-bottom direction of the image is correct. By thus limiting the wait time for the input of the top-bottom information by the operator, the productivity of copy output can be prevented from being degraded.

The reduced image and so on of the original sheet of which the automatic top-bottom recognition has failed are displayed with regard to all the original sheets of which the automatic top-bottom recognition has failed. If the number of original sheets of which the automatic top-bottom recognition has failed exceeds the number of four in the aforementioned example of the four-block division display, then the display contents of each block on the selection screen DP change and the reduced images and so on of the remaining original sheets of which the automatic top-bottom recognition has failed are displayed upon the completion of the input by means of the "OK" key TP101 or the "NG" key TP102 with regard to the displayed four original sheets.

It is, of course, acceptable to display the reduced images and so on of the original sheets of which the automatic top-bottom recognition has failed one sheet by one sheet on the whole screen instead of dividing the selection screen DP. It is also acceptable to display the image of each original sheet of which the automatic top-bottom recognition has failed at the equal magnification ratio instead of reducing the image.

Figure 14:
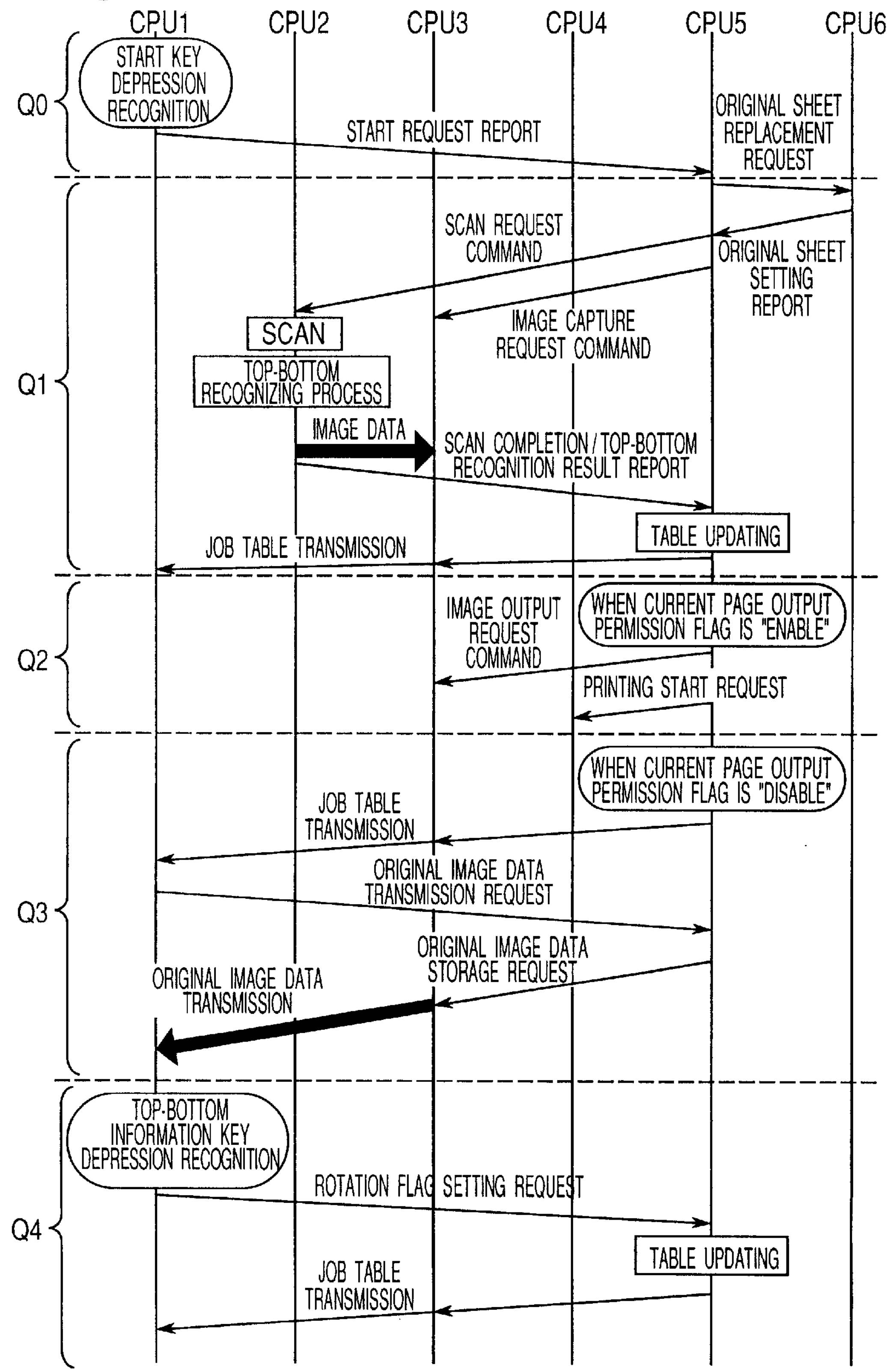
FIG. 14 is a chart showing a sequence of transmitting and receiving data, commands and so on among the CPU1 through the CPU6 in order to set the top-bottom directions of output images in a specified direction.

FIG. 14 shows the sequence of transmitting and receiving data, commands and so on among the CPU1 through CPU6 in order to set the top-bottom directions of the output images in a consistent direction.

First, according to a start sequence QO, upon recognizing the touch of a START key 96 on the operation panel OP, the CPU1 informs the CPU5 of a request for starting this copying machine.

According to a scan/top-bottom recognition sequence Q1, if a standby original sheet exists in the automatic document feeder 500 at the time of reception of the start request from the CPU1, then the CPU5 requests the replacement of the original sheet by informing the CPU6 of an original sheet replacement request command. The CPU6 executes an original sheet replacing process according to the original sheet replacement request command from the CPU5 and transmits an original sheet setting report to the CPU5 upon setting the original. It is to be noted that these processes relevant to the original sheet replacement are unnecessary if no standby original sheet exists in the automatic document feeder 500.

Subsequently, the CPU5 transmits a scan request command to the CPU2 to require the scan of the image data and transmits an image capture request command to the CPU3 to require the writing of the image data into the memory unit 30.

The CPU2 reads the image by executing the scan of the original sheet in response to the scan request command from the CPU5, executes a top-bottom recognizing process and so on and thereafter transmits the obtained image data to the CPU3. The CPU3 stores the image data transmitted by the CPU2 into the memory unit 30 in response to the image capture request command from the CPU5. The CPU2 informs the CPU5 of the completion of scan and the top-bottom recognition result.

Upon receiving the top-bottom recognition result flag setting request from the CPU2, the CPU5 updates the contents of the job table according to the contents of the request and transmits the contents data of the updated job table to the CPU1 and the CPU3. This sequence Q1 is continuously executed parallel independently of the top-bottom recognizing process of each original sheet until no standby original is left on the automatic document feeder 500. That is, the reading of the images of the subsequent original sheets is also executed while the automatic top-bottom recognizing process of the read original image is being executed, while the input of top-bottom information by the operator is awaited with regard to the original sheet whose reduced image is displayed on the LCD touch panel 91 and while the processing is executed in accordance with the inputted top-bottom information. This can prevent the productivity of copy output from being degraded.

According to a printing sequence Q2, the CPU5 refers to the job table, and if the output permission flag of the current page is in the "enable" state, then the CPU5 transmits an image output request command to the CPU3 to require the reading of the image data from the memory unit 30 and transmits a printing start request command to the CPU4 to start the printing operation of the printer unit PRT. In this stage, the CPU3 rotates the image data of the current page and outputs the resulting image data to the memory unit 30 when the rotation flag of the current page is "true" or outputs the image data of the current page to the memory unit 30 without rotating the image data when the rotation flag of the current page is "false". Therefore, the top-bottom directions of the output images to be formed on a paper sheet by the printer PRT under the control of the CPU4 can be unified in a specified direction.

If the output permission flag of the current page is "disable" , then the CPU5 does not transmit the printing start request command.

After transmitting the printing start request command of the current page, the CPU5 increments (increases by one) the number of the current page and executes again this sequence Q2 in the next cycle of processing.

According to a top-bottom information input sequence Q3, the CPU5 transmits the contents data of the job table to the CPU1 and the CPU3 when the top-bottom recognition result flag setting request received from the CPU2 during the sequence Q1 has "failed", thereby informing the CPU1 and the CPU3 of the fact that an original page of which the automatic top-bottom recognition has failed.

Upon recognizing that the original page of which the automatic top-bottom recognition has failed exists, the CPU1 transmits an original image data transmission request report to the CPU5 to require the transmission of the page number and the reduced image data of the original sheet of which the top-bottom recognition has failed.

Upon receiving the original image data transmission request report from the CPU1, the CPU5 transmits an original image data storage request command to the CPU3 to transmit to the CPU1 the reduced image data of the original page of which the top-bottom recognition has failed.

The CPU1 stores the reduced image data from the CPU3 into the RAM130 (see FIG. 2) together with the page number of the original sheet of which the top-bottom recognition has failed.

The CPU1 displays the selection screen DP as shown in FIG. 17 on the LCD touch panel 91 by using the page number and the reduced image data of the original sheet stored in the RAM130. Then, the CPU1 prompts the operator to touch either the "OK" key TP101 or the "NG" key TP102.

According to a job table update sequence Q4, when the operator touches either the "OK" key TP101 or the "NG" key TP102 or when neither the "OK" key TP101 nor the "NG" key TP102 is touched within a specified time measured by the internal time counting timer from the time point of the display of the reduced image of the original sheet (or from the time of the completion of the reading of the original), the CPU1 transmits a rotation direction flag setting request to the CPU5. Upon receiving the rotation direction flag setting request from the CPU1, the CPU5 updates the contents of the job table JT according to the contents of the request and transmits the contents data of the updated job table to the CPU1 and the CPU3.

Figure 16B:
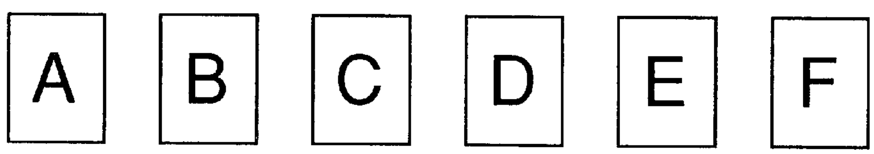

Subsequently, the printing sequence Q2 is executed again according to the contents of the updated job table. Therefore, even if the automatic top-bottom recognition of some original images has failed as shown in FIG. 17, then the automatic top-bottom recognizing process can be supplemented by human determination, so that the top-bottom directions of the output images can consistently be unified in an identical direction as shown in FIG. 16B.

When the number of original sheets is less than a specified number of sheets, it is acceptable to collectively display the reduced images and so on of the original sheets of which the automatic top-bottom recognition has failed on the LCD touch panel after the completion of the reading of all the original sheets set in the automatic document feeder 500 and let the operator collectively input the top-bottom directions. The above is because the productivity of copy output is not so degraded if the above-mentioned operation is executed when the number of original sheets is small.

The top-bottom directions of the output images are directed in a consistent direction by supplementing the automatic top-bottom recognizing process of the original image by human determination according to this embodiment. However, the present invention is not limited to this and broadly applied to the case where the automatic discrimination process as to whether or not to execute a specified mode is supplemented by human determination. This allows the process in the mode to be reliably executed.

There is, for example, an automatic color selection function for automatically discriminating the colors (colors other than black and white) included in the image of the read original sheet and automatically setting the color mode of the printer unit PRT according to a result of discrimination. Even in a copying machine having the automatic color selection function as described above, the color mode can be consistently appropriately selected by supplementing the color automatic discrimination process by human determination. In this case, it is proper to provide the CPU2 (image processing section) with an automatic color selecting function with the color-compatible photoelectric transducer element 17 and LCD touch panel 91.

Though the present invention is described as a copy machine in the above embodiments by way of example, the present invention is generally applicable to apparatuses and methods automatically discriminating a top-bottom direction of an image. Therefore, the present invention includes an image processing apparatus or an image processing method automatically discriminating a top-bottom direction of an image.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A copying machine comprising:

a discriminating section for discriminating on the basis of information of an image of an original a top-bottom direction of the image;

a display section for displaying the image of the original when the discriminating section fails in discriminating the top-bottom direction of the image;

an interface for receiving information that is inputted by an operator and is relevant to the top-bottom direction of the image of the original displayed in the display section;

a rotation processing section that rotates or does not rotate the image of the original so that the top-bottom directions of images to be outputted become consistent according to a result of discrimination of the discriminating section and the information inputted via the interface; and an image forming section for forming on a sheet an image outputted from the rotation processing section.

2. A copying machine as claimed in claim 1, wherein an image reading section for successively reading images of a plurality of originals so as to obtain information of the images of the originals is further provided, and the image display in the display section and the image reading in the image reading section are concurrently executed.

3. A copying machine as claimed in claim 1, wherein when no information of the top-bottom direction of the image of the original displayed in the display section is inputted via the interface within a specified time, the rotation processing section does not rotate the image of the original.

4. A copying machine as claimed in claim 1, wherein the display section displays a page number of the image of the original together with the image of the original.

5. An image processing apparatus comprising:

an input section for inputting image data;

a discriminating section for discriminating on the basis of inputted image data a top-bottom direction of an image represented by the image data;

a display for displaying the image represented by the image data when the discriminating section fails in discriminating the top-bottom direction of the image;

an interface for receiving information that is inputted by an operator and is relevant to the top-bottom direction of the image displayed on the display; and a rotation processing section that rotates or does not rotate the image so that the top-bottom directions of images to be outputted become consistent by processing the image data according to a result of discrimination of the discriminating section and the information inputted via the interface.

6. An image processing apparatus as claimed in claim 5, wherein an image reader for successively reading images of a plurality of originals so as to obtain image data to be inputted to the input section is further provided, and the image display on the display and the image reading by the image reader are concurrently executed.

7. An image processing apparatus as claimed in claim 5, wherein when no information of the top-bottom direction of the image displayed on the display is inputted via the interface within a specified time, the rotation processing section does not rotate the image.

8. An image processing apparatus as claimed in claim 5, wherein the display displays a page number of the image together with the image.

9. An image processing apparatus comprising:

an input section for inputting image data;

a discriminating section for discriminating on the basis of inputted image data a process to which the image data should be subjected;

a display for displaying an image represented by the image data when the discriminating section fails in the discrimination;

an interface for receiving information that is inputted by an operator and is relevant to the process to which the image displayed on the display should be subjected; and an image processing section for processing the image data according to a result of discrimination of the discriminating section and the information inputted via the interface.

10. An image processing apparatus as claimed in claim 9, wherein an image reader for successively reading images of a plurality of originals so as to obtain image data to be inputted to the input section is further provided, and the image display on the display and the image reading by the image reader are concurrently executed.

11. An image processing apparatus as claimed in claim 9, wherein the display displays a page number of the image together with the image.

12. An image processing method comprising the steps of:

inputting image data;

discriminating on the basis of inputted image data a top-bottom direction of an image represented by the image data;

displaying the image represented by the image data on a display when the discrimination results in failure in the discriminating step;

receiving information that is inputted by an operator and is relevant to the top-bottom direction of the image displayed on the display; and rotating or not rotating the image so that the top-bottom directions of images to be outputted become consistent by processing the image data according to a result of discrimination in the discriminating step and inputted information in the receiving step.

13. An image processing method as claimed in claim 12, wherein the image data is inputted in the inputting step by successively reading images of a plurality of originals, and the displaying step and the inputting step are concurrently executed.

14. An image processing method as claimed in claim 12, wherein a page number of the image is displayed together with the image on the display in the displaying step.

* * * * *

UNITED STATES PATENT AND TRADEMARK OFFICE

CERTIFICATE OF CORRECTION

PATENT NO. : 6,501,920 B2
DATED : December 31, 2002
INVENTOR(S) : Jiro Goto et al.

It is certified that error appears in the above-identified patent and that said Letters Patent is hereby corrected as shown below:

Title page,
Add the following:

-- [73] Assignee: Minolta Co., Ltd., Osaka, Japan --

Signed and Sealed this

Twenty-sixth Day of August, 2003

JAMES E. ROGAN
*Director of the United States Patent and Trademark Office*